Patented Jan. 8, 1935

1,986,879

UNITED STATES PATENT OFFICE 1,986,879

DERIVATIVE OF CELLULOSE COMPOSITION AND METHOD OF MAKING THE SAME

Camille Dreyfus, New York, N. Y., and William Whitehead, Cumberland, Md., assignors to Celanese Corporation of America, a corporation of Delaware No Drawing. Application October 22, 1929
Serial No. 401,624

5 Claims. (Cl. 106—40)

This invention relates to the production of compositions containing organic derivatives of cellulose and relates more particularly to the preparation of useful materials from waste filtering media employed in filtering solutions of derivatives of cellulose.

An object of our invention is to prepare compositions containing organic derivatives of cellulose from waste or spent filtering media. Other objects of our invention will appear from the following detailed description.

In the preperation of yarns, films, plastics or coating compositions containing organic derivatives of cellulose, the derivative is dissolved in solvents, and the solution thus formed is filtered through suitable filtering media in order to remove suspended matter. After a time, the filtering media become so clogged with the suspended matter separated thereby, that it is necessary to renew the same. The spent filtering media have heretofore been discarded. This however entails a considerable waste since the spent filtering media contain a large amount of the derivative of cellulose. We have found that useful compositions may be prepared from such spent filtering media.

In accordance with our invention, we prepare useful compositions or articles from the spent filtering medium that has been employed for filtering solutions or plastics of organic derivatives of cellulose by dissociating the same in an appropriate manner. The composition thus formed may be worked up into solutions, plastics, molding powder and the like, which may be employed for making articles ordinarily containing filling material.

The filtering medium employed in this invention may be of any suitable nature, such as cellulose tissue, cloth, flannel, paper, etc. As stated the filtering medium has been employed for filtering solutions of organic derivatives of cellulose such as organic esters of cellulose and cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

The spent filtering medium containing the derivative of cellulose may be disintegrated while it still contains residual solvent from the solution which it has filtered. If desired the filtering medium may be dried and then ground. In another form of carrying out this invention, the filtering medium may be kneaded with a solvent for the derivative of cellulose. However we prefer to knead or pulp the spent filtering medium with a material that acts as a softening agent for the derivative of cellulose but which is not a solvent therefor. A suitable softening agent has been found to be a mixture of a solvent and a nonsolvent in such proportions that the whole is a softening agent but not a solvent. Examples of such mixtures are aqueous solutions of acetone containing from 15 to 50% of acetone.

In the case where a solvent or a solution of the derivative of cellulose has been added to the filtering material to aid in the disintegration of the same, the resulting mass may be used as a plastic composition, with or without the further addition of a derivative of cellulose, solvents, filling materials, and preferably after the addition of a plasticizing agent such as triphenyl phosphate, dibutyl tartrate, diethyl phthalate, triacetin, mono methyl xylene sulfonamid or ethyl toluene sulfonamid. This plastic mass may be worked into sheets, tubes, rods, blocks or any other articles in any known manner. If a relatively large amount of volatile solvent is added to the mass, coating compositions may be made.

In those cases where the spent filtering material has been ground while dry, or has been disintegrated in the presence of a volatile softening agent, the softening agent removed and the material then ground, the dry powder may be used as such, but preferably after the addition of a plasticizing agent and other desired materials, as a molding powder. Such molding powder may be molded under heat and pressure to any desired shape. Generally it will be desirable to add further amounts of the derivative of cellulose to the powder thus formed, in order to have the desired percentage of derivative of cellulose present in the final product. The powder formed in this modification may be dissolved in appropriate amounts of solvents to form plastic or liquid coating compositions.

The disintegrated filtering medium together with the matter that has been retained by the same from the solutions of the derivatives of cellulose that have been filtered thereby are present as filling or effect materials in the composition formed in accordance with our invention. If desired this filling material may be supplemented by the addition of other filling materials, dyes, pigments, etc., ordinarily employed in the art.

In order further to illustrate our invention, but without being limited thereto, the following specific example is given.

*Example*

We take a spent filtering medium comprising layers of cellulose tissue covered with cheesecloth that have been employed for filtering a solution of an acetone soluble cellulose acetate in acetone, which solution is adapted to be used for spinning yarns or filaments. The cheesecloth is preferably removed from the filtering medium while the same is still moist with acetone, since such cheesecloth is more difficult to disintegrate than the cellulose tissue. To the cellulose tissue is added an equal weight of a mixture consisting of 20 parts of acetone and 80 parts of water. The mass is kneaded in a Werner Pfleiderer or similar type of mixer for about 2 hours, whereupon the solid material is broken up and evenly dispersed to form a smooth pulp. The pulp thus formed is dried.

The dried pulp may then be finely ground in a suitable mill while plasticizers such as a mixture of triphenyl phosphate, dibutyl tartrate and ethyl toluene sulfonamid are added thereto. Preferably there is also added a further quantity of cellulose acetate so that the final product has the following composition:

| | Parts by weight |
|---|---|
| Cellulose acetate | 47 |
| Filler | 31.8 |
| Plasticizer | 21.2 |

This molding powder may be molded under heat and pressure to form articles of any desired shape.

The term "filtering material" as used in the specification and hereinafter in the claims is to be construed to mean material employed for filtering solutions of organic derivatives of cellulose.

It is to be understood that the foregoing detailed description is given merely by way of illustration, and that many variations may be made therein without departing from the spirit of our invention.

Having described our invention, what we claim and desire to secure by Letters Patent is:

1. The method of preparing a molding powder comprising disintegrating spent filtering material which has been used for filtering organic derivatives of cellulose and which contains the absorbed organic derivative of cellulose by kneading the same in the presence of a volatile swelling agent for the organic derivative of cellulose, removing the volatile swelling agent, adding a plasticizer for the organic derivative of cellulose and grinding the mixture.

2. The method of preparing a molding powder comprising disintegrating spent filtering material which has been used for filtering cellulose acetate and which contains the absorbed cellulose acetate by kneading the same in the presence of a volatile swelling agent for the cellulose acetate, removing the volatile swelling agent, adding a plasticizer for the cellulose acetate and grinding the mixture.

3. The method of preparing a molding powder comprising disintegrating spent filtering material which has been used for filtering cellulose acetate and which contains the absorbed cellulose acetate by kneading the same in the presence of a volatile swelling agent for the cellulose acetate comprising an aqueous solution of acetone of 15 to 50% concentration, removing the volatile swelling agent, adding a plasticizer for the cellulose acetate and grinding the mixture.

4. A molding powder containing finely divided spent filtering material which has been used for filtering an organic derivative of cellulose, the organic derivative of cellulose absorbed by said filtering material and a plasticizer in intimate admixture.

5. A molding powder containing finely divided spent filtering material which has been used for filtering cellulose acetate, the cellulose acetate absorbed by said filtering material and a plasticizer in intimate admixture.

CAMILLE DREYFUS.
WILLIAM WHITEHEAD.